(12) United States Patent
Yuval et al.

(10) Patent No.: US 7,546,461 B2
(45) Date of Patent: Jun. 9, 2009

(54) STRENGTHENING SECURE HASH FUNCTIONS

(75) Inventors: Gideon A. Yuval, Mercer Island, WA (US); Ramarathnam Venkatesan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 786 days.

(21) Appl. No.: 11/168,842

(22) Filed: Jun. 28, 2005

(65) Prior Publication Data
US 2006/0294386 A1    Dec. 28, 2006

(51) Int. Cl.
*G06F 9/00* (2006.01)
(52) U.S. Cl. ...................................................... 713/168

(58) Field of Classification Search .................. 713/170
See application file for complete search history.

(56) References Cited

U.S. PATENT DOCUMENTS

| | | |
|---|---|---|
| 5,892,829 A | 4/1999 | Aiello et al. |
| 6,314,186 B1 | 11/2001 | Lee et al. |
| 6,578,144 B1 | 6/2003 | Gennaro et al. |

*Primary Examiner*—Thomas Peeso
(74) *Attorney, Agent, or Firm*—Lee & Hayes, PLLC

(57) ABSTRACT

Systems and/or methods are described that strengthen secure hash functions. These systems and/or methods may, in some embodiments, create a random-appearing element based on a message and using a process. The element may then be assembled with the message. This assembly may be hashed using a secure hash function. Using the same process and secure hash function, the message may later be authenticated.

18 Claims, 6 Drawing Sheets

STRENGTHENING SECURE HASH FUNCTIONS

BACKGROUND

Secure hash functions are often used to authenticate messages. Digital signatures, for instance, rely on secure hash functions. A person can digitally sign a document by signing a hash of the document computed using a secure hash function. Later, the digital signature can be authenticated by computing, with the same hash function, a hash of a document purported to be the document that the person signed. If the first hash and the second hash are identical, the documents are deemed identical. If the documents are identical, the digital signature is authentic.

The two documents are deemed identical—rather than known to be identical—because it may be possible for hashes of two different documents to be the same. This is called a "collision".

An example of a collision can be shown in mathematic terms. Assume that a secure hash function "H(M)" is capable of operating on an arbitrary-length message "M" and return a fixed-length hash "h". Thus, "h=H(M)", where "h" has a fixed length. This leaves open the possibility, however, that if the message "$M_1$" is larger than the fixed-length hash "h", two different messages "$M_1$" and "$M_2$" can have equivalent hashes "h", such that "$H(M_1)=H(M_2)$". If "$H(M_1)=H(M_2)$" a collision has occurred.

The probability of a collision is important to ascertaining the probability that any particular message is authentic. For a secure hash function generating a hash of 160 bits, for instance, the probability that two random messages have identical hashes is one in $2^{160}$. But a group of random messages from which any two can have the same hash will not need to be nearly as large as one might expect. For it to be likely that any two messages of a group will have identical hashes, the group will only need to have about $2^{80}$ messages for a 160-bit hash.

For this reason, a person attempting to cause a collision, i.e., cause two messages to have identical hashes, can produce such a collision in about $2^{80}$ or fewer attempts with hashes of 160 bits. Assume, for example, that Willy wants to swindle George. Willy could write two contracts, one that is favorable to George and one that is very favorable to Willy. Willy can make subtle changes (like adding a space) to each document and run hash values for each. Willy can continue to do so until a hash value for one of the pro-Willy contracts matches a hash value for one of the pro-George contracts. By so doing, Willy can be able 11 create a collision between the pro-George contract, "$M_g$", and the pro-Willy contract, "$M_w$", so that "$H(M_g)=H(M_w)$". Once Willy has done so, he gets George to sign the pro-George contract using a protocol in which George signs the hash value "h". At some time in the future, Willy substitutes the pro-George contract is that George signed with the pro-Willy contract that George did not sign. Now Willy can convince an adjudicator (e.g., a judge in a court of law) that George signed the pro-Willy contract because a hash of the pro-Willy contract will match the hash value "h" of George's signature for the pro-George contract.

Causing such a collision with large hashes, like 160-bit hashes, was until recently considered very difficult. Altering and computing hashes for $2^{80}$ messages would take hundreds of computers hundreds or thousands of years at current processing speeds. Recently, however, some have argued that a collision is possible with only $2^{69}$ messages by making small, controlled changes to bits of a message. If this is true, a few hundred computers may be able cause a collision in a few months at current processing speeds; in five or ten years, perhaps one computer might be able to cause a collision in less than a year.

This particular possibility, as well as other attacks that make creating collisions potentially easier than is ideal, have caused people to doubt the security and usefulness of some secure hash functions.

SUMMARY

Systems and/or methods ("tools") are described that strengthen secure hash functions. The tools may, in some embodiments, create a random-appearing element based on a message. The tools may then assemble the element with the message. This assembly may be hashed using a secure hash function, where the resulting hash is the same length as a hash computed with the same secure hash function over the message without the element. By so doing, the tools may strengthen a secure hash function by reducing the effectiveness of some types of attacks attempting to create a collision.

In some other embodiments, the tools may encrypt sub-blocks of a message, compute an exclusive-or (XOR) of the sub-blocks and encrypted sub-blocks, and assemble the sub-blocks with XOR sub-blocks. By so doing, a reproducible assembly of bits that are not easily controllable by manipulating bits of the message may be hashed. The resulting hash may be more secure that a hash computed over the message itself.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The same numbers are used throughout the disclosure and figures to 16 reference like components and features.

DETAILED DESCRIPTION

Overview

Figure 1:
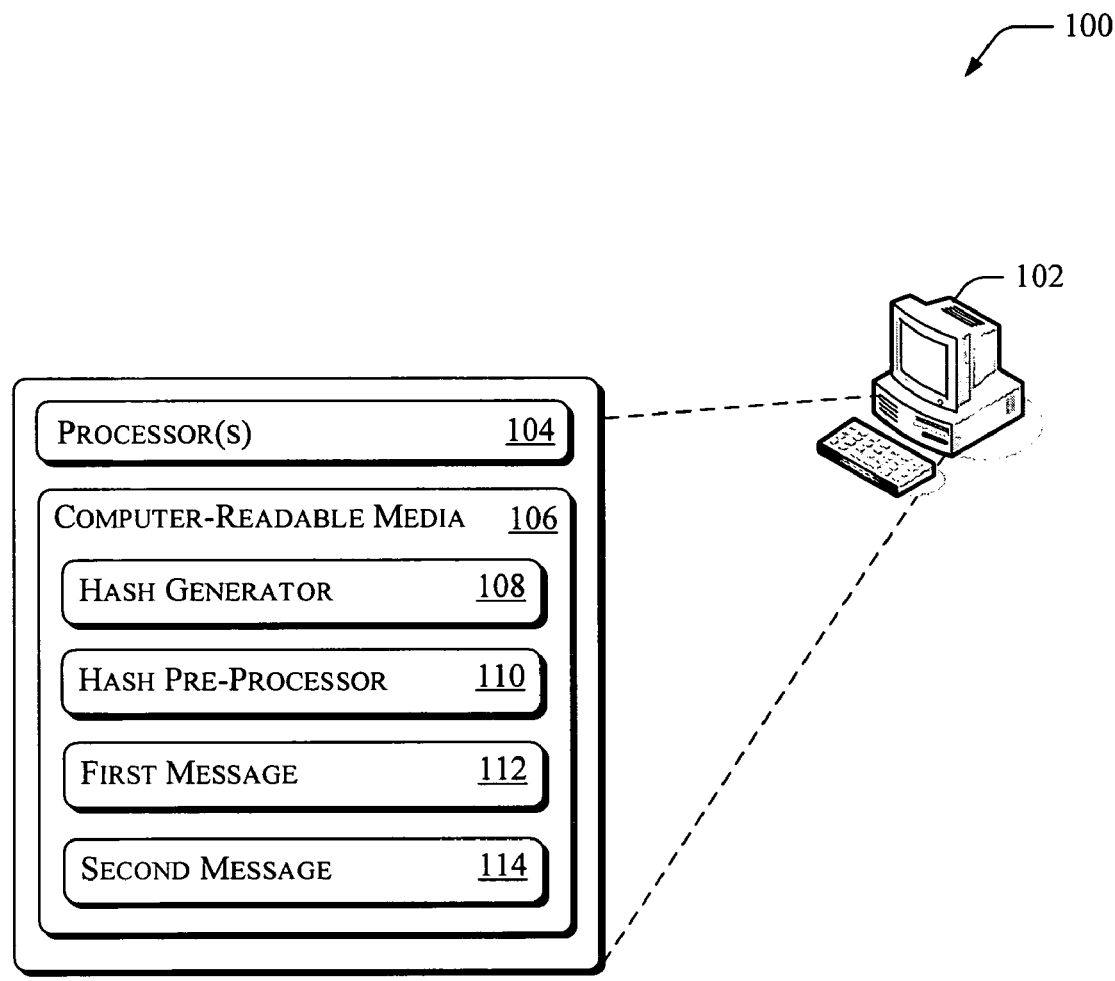
FIG. 1 illustrates an exemplary operating environment in which various embodiments can operate.

The following document describes system(s) and/or method(s) ("tools") by which secure hash functions may be strengthened. The tools may strengthen a secure hash function by reducing the effectiveness of some types of attacks attempting to create a collision. For example, the tools may strengthen a secure hash function from an attack based on making small controlled changes to the bits of a message.

The tools may create, in some embodiments, a random-appearing element based on a message and using a process. The tools may then assemble the element with the message. This assembly may be hashed using a secure hash function, where the resulting hash is the same length as a hash computed with the same secure hash function over the message. Another random-appearing element may also be created based on another message and using the same process, the resulting other random-appearing element being identical to the first random-appearing element if the messages are identical. By so doing, another assembly may be created at some future point from the other message where the hash computed over this other assembly will be identical to the hash computed over the first assembly if the messages are identical. This permits a message to be authenticated.

In another embodiment, the tools perform a block cipher over blocks of a message, resulting in encrypted blocks. The tools then compute an operation, such as an ADD, SUB, or excusive-or ("XOR") of the encrypted blocks and the blocks, resulting in ADD, SUB, or XOR blocks. The tools then assemble the ADD, SUB, or XOR blocks with the blocks, resulting in assembled blocks. The assembled blocks can then be hashed. The bits of the assembled blocks are not easily controllable by altering bits of the message, which potentially thwarts attempts to create a collision by carefully altering bits of the message.

The tools can also, in still another embodiment, break blocks of a message into sub-blocks. The tools then compute an encryption key based on one or more of the sub-blocks. The tools encrypt a sub-block with an encryption function having the key to provide an encrypted sub-block, where the key is computed from a different sub-block than the one being encrypted. This can be repeated until a number of encrypted sub-blocks equals the number of the sub-blocks. The encrypted sub-blocks and the sub-blocks are then concatenated. The resulting concatenation comprises two concatenated blocks equal in size to that of the block. These concatenated blocks each comprise sub-blocks and encrypted sub-blocks. The tools can also build each concatenated block to comprise sub-blocks and encrypted sub-blocks where the encrypted sub-blocks are encrypted using a key computed from sub-blocks of the other of the two concatenated blocks. The concatenated blocks can be hashed with a secure hash function.

Exemplary Operating Environment

Before describing the tools in detail, the following discussion of an exemplary operating environment is provided to assist the reader in understanding where and how the tools can be employed. The description provided below constitutes but one example and is not intended to limit application of the tools to any one particular operating environment.

FIG. 1 illustrates one such operating environment generally at 100 comprising a computer 102 having processor(s) 104 and computer-readable media 106. The processors are capable of accessing and/or executing the computer-readable media. The computer-readable media comprises or has access to a hash generator 108 capable of computing a secure hash, a hash pre-processor 110 capable of strengthening a secure hash function, and two messages, first message 112 and second message 114.

Pre-Processing a Message

The following discussion describes exemplary ways in which elements of operating environment 100 can strengthen a secure hash function by processing a message prior to a hash being computed over that message. This process is effective to reduce an adversary's control of the bits over which the hash is computed.

Figure 2:
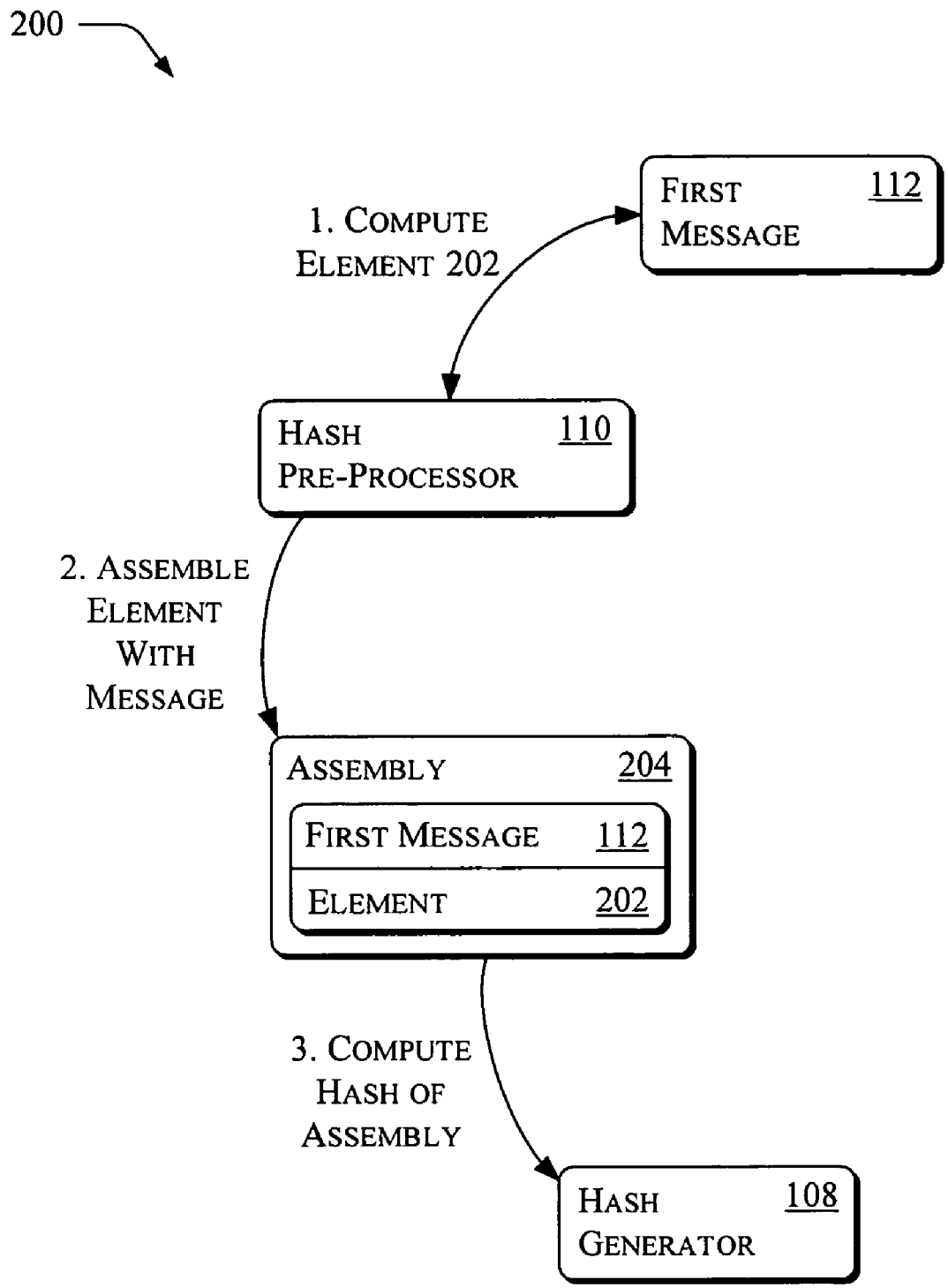
FIG. 2 is an exemplary flow diagram for processing a message.

Referring to FIG. 2, an exemplary flow diagram 200 for processing first message 112 is shown. Flow diagram 200 illustrates a set of actions by, and accompanying communications between, elements of the environment 100. The actions and accompanying communications are marked with arrows. This flow diagram may be implemented in any suitable hardware, software, firmware, or combination thereof. In the case of software and firmware, this diagram represents sets of operations implemented as computer-executable instructions.

At arrow 1, hash pre-processor 110 computes a reproducible, random-appearing element 202 based on first message 112. The tools can compute this element by logically operating on portions of the message and encrypted portions of the message, such as those logical operations described in embodiments below. Element 202 is not actually random but appears sufficiently random such that it is not easily controlled with changes to bits of the first message. The element is reproducible; identical elements can be generated based on identical messages and identical protocols for producing the elements. Thus, if two identical messages are processed in the same way and the resulting assembly is hashed using the same hash function, the identical messages will have identical hashes. This permits messages to be authenticated using the hash.

At arrow 2, hash pre-processor 110 builds an assembly 204 comprising first message 112 and element 202. This assembly comprises bits that are not easily controllable. Thus, while this assembly comprises bits of first message 112 and bits depending on those bits (element 202), the bits of the assembly are not easily subject to malicious manipulation by manipulating the first message. In this embodiment the assembly can be any combination of the element and the first message such that the assembly is reproducible based on the first message.

At arrow 3, hash generator 108 computes a hash of the assembly. This hash is effective to permit the first message to be authenticated using a same hash function as that of the hash generator and a same element. The sameness of the element can be permitted by a same first message being processed by the hash pre-processor in a same manner.

In this embodiment, hash generator 108 is not altered. Rather, the bits over which the hash is computed are altered, not the hash function itself. This enables continued usage of standard secure hash functions and systems, such as Secure Hash Algorithm-1 ("SHA-1") and Secure Hash System (SHS), respectively.

While an adversary may have complete control over bits of a message itself, by preprocessing the message as described in flow diagram 200, the adversary no longer has control over many of the bits over which a hash is computed. This is because the hash is computed over the preprocessed message and not just the message itself. An adversary wishing to create a collision (a same hash with two different messages) can currently attempt to do so by making small, controlled changes to beginning bits of to-be-hashed blocks of a message. The tools, following flow diagram 200, however, may decrease an adversary's ability to improve odds of a collision between the adversary's message and that of another message. A small change to the message by an adversary will greatly alter the preprocessed message, potentially reducing the adversary's ability to create a collision.

Block Ciphering and Exclusive-Or Operations

The following section describes exemplary ways in which the tools strengthen secure hash functions using block ciphering and exclusive-or operations. It is to be appreciated and understood that the description below is not intended to limit application of the claimed subject matter.

Figure 3:
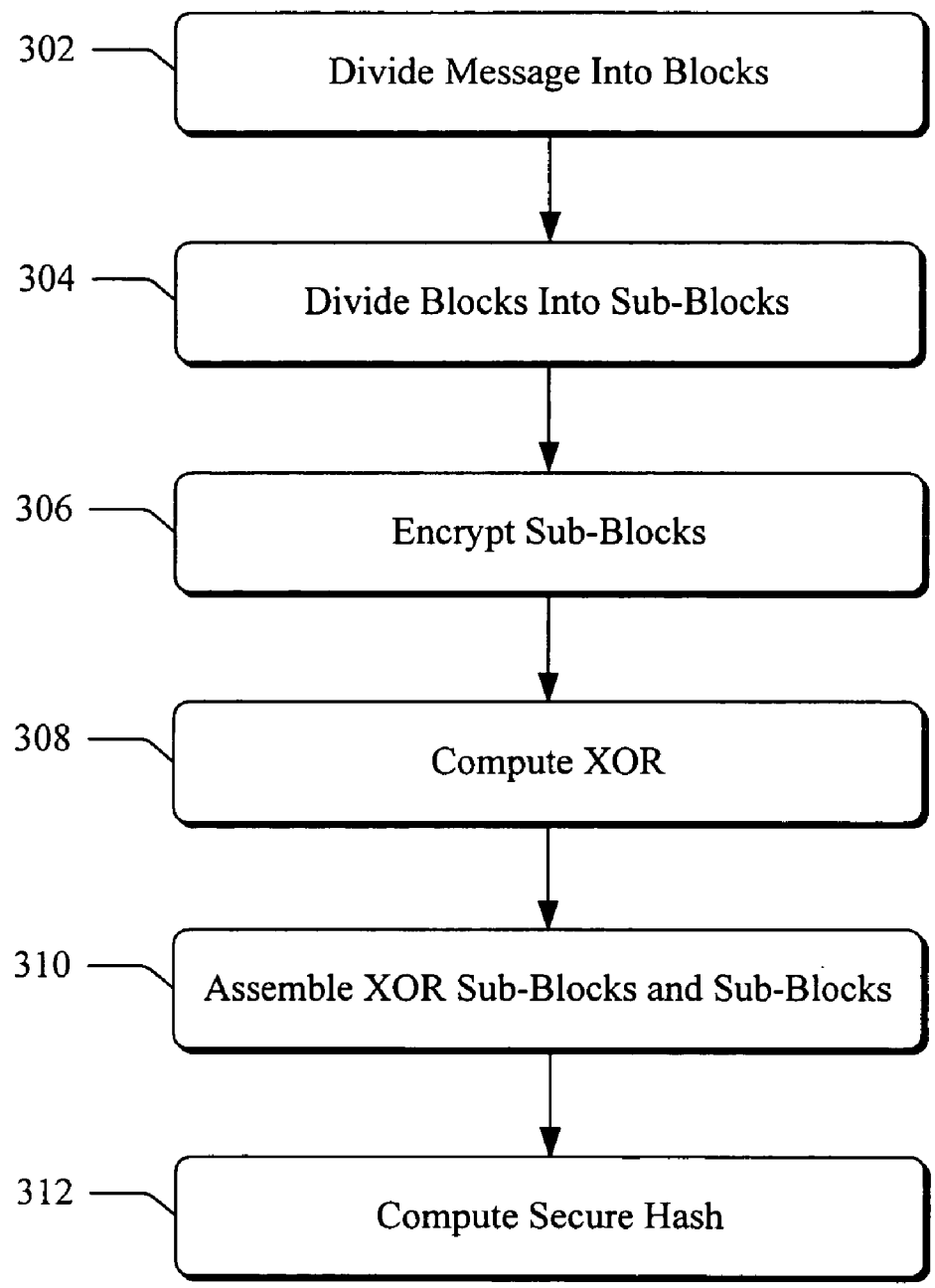
FIG. 3 is an exemplary process for securing hash functions using block ciphering and exclusive-or operations.

In FIG. 3, an exemplary process 300 is shown illustrated as a series of steps representing individual operations or acts. In an embodiment described below, elements of the operating environment 100 of FIG. 1, such as hash pre-processor 110, perform this process. This and other processes disclosed herein may be implemented in any suitable hardware, software, firmware, or combination thereof; in the case of software and firmware, these processes represent a set of operations implemented as computer-executable instructions stored in computer-readable media 106 and executable by processor(s) 104.

Step 302 divides a message into blocks. These blocks can be of a size capable of being handled by a secure hash function. In an illustrated embodiment shown in FIG. 4, hash pre-processor 110 divides first message 112 into a series of 512-bit blocks, three of which are shown at 402.

Step 304 divides a message into sub-blocks. Each sub-block can be divided from larger blocks, such as blocks 402. In the illustrated embodiment, four sub-blocks 404 of 128 bits are divided from each block 402. The sub-blocks divided from one of the blocks are shown labeled: "A", "B", "C", and "D".

Step 306 encrypts sub-blocks of a message to provide encrypted sub-blocks. In one embodiment, step 306 encrypts sub-blocks of a message to provide encrypted sub-blocks where the number of sub-blocks may be arbitrary.

Three operations can be performed called "K", "L", and "T". The K function generates a key. The L function generates a pad to make ciphers non-reversible even if the key is known. The T function generates a tag ("t") that ensures that the transformation of the sub-blocks remains one-to-one with a high probability. This may be represented mathematically in the following manner with four sub-blocks A, B, C, and D:

$$K(A,B,C,D)=\alpha, \beta, \gamma, \delta$$

$$L(A, B, C, D)=A', B', C', D'$$

$$T_{key}(A, B, C, D)=t$$

More generally, this may be represented mathematically as:

$$E_\alpha(A)=R, E_\beta(B)=S, E_\gamma(C)=P, E_\delta(D)=Q$$

$$U=R+A', V=S+B', W=P+C', X=Q+D'$$

$$T_{U,V,W,X}(A, B, C, D)=t$$

With this output of t, U, V, W, and X, a case may be shown where:

$$K(A, B, C, D)=CD, CD, AB, AB$$

$$L(A, B, C, D)=A, B, C, D$$

$$T_{key}(A, B, C, D)=A, B, C, D$$

And, to avoid permitting an adversary to choose AB as a key, the function K may be:

$$K(A, B, C, D)=CD, CD, RS, RS$$

To further mix the blocks another bijective function may also be used.

An example of this process is shown below. Here step 306 encrypts original sub-blocks A, B, C, and D with a block cipher. Step 306 can do so with hash pre-processor 110, thereby encrypting sub-block A using an encryption function "$E_n$" having an encryption key "$_n$". Here "R" is the result of encrypting sub-block A, called an encrypted sub-block. The encryption key is derived from bits of another sub-block divided from the same block, in this case either sub-block B, C, D, or a combination of B, C, and/or D. In this embodiment the key is derived from sub-blocks C and D, and so is labeled "$_{cd}$". This can be represented mathematically as:

$$E_{cd}(A)=R$$

The encryption function used can be a 128-bit Advanced Encryption Standard ("AES") encryption function. The key can be derived from other sub-blocks such that the key is based on one or more other sub-blocks and is also reproducible.

Similarly, step 306 can encrypt other sub-blocks B, C, and D effective to provide other encrypted sub-blocks. These are represented mathematically below:

$$E_{cd}(B)=S$$

$$E_{ab}(C)=P$$

$$E_{ab}(D)=Q$$

Thus, a number of encrypted sub-blocks are built, each being reproducible and based on bits of one or more sub-blocks.

Step 308 computes an exclusive-or (XOR) of a sub-block and an encrypted sub-block to provide an XOR sub-block.

Here hash pre-processor 110 computes an exclusive-or (XOR or "⊕" in mathematical notation) with results of:

$$C \oplus P$$

$$D \oplus Q$$

$$A \oplus R$$

$$B \oplus S$$

Each of these results appears random and is not easily under the control of an adversary. Thus, even if an adversary maliciously alters bits of A, B, C, or D, such as with small, controlled changes, the XOR sub-blocks may not be maliciously chosen with a corresponding level of control as permitted in altering the bits of A, B, C, or D.

Step 310 assembles sub-blocks and XOR sub-blocks to provide assembled blocks. Each assembled block can be the same bit-size as that of the blocks, though there can be twice as many assembled blocks as blocks on which they are based.

As illustrated, sub-blocks A, B, C, and D are concatenated with XOR blocks C⊕P, D⊕Q, A⊕R, and B⊕S. They are assembled here into two assembled blocks of:

$$C \oplus P \| D \oplus Q \| A \| B$$

and $$A \oplus R \| B \oplus S \| C \| D$$

Figure 4:
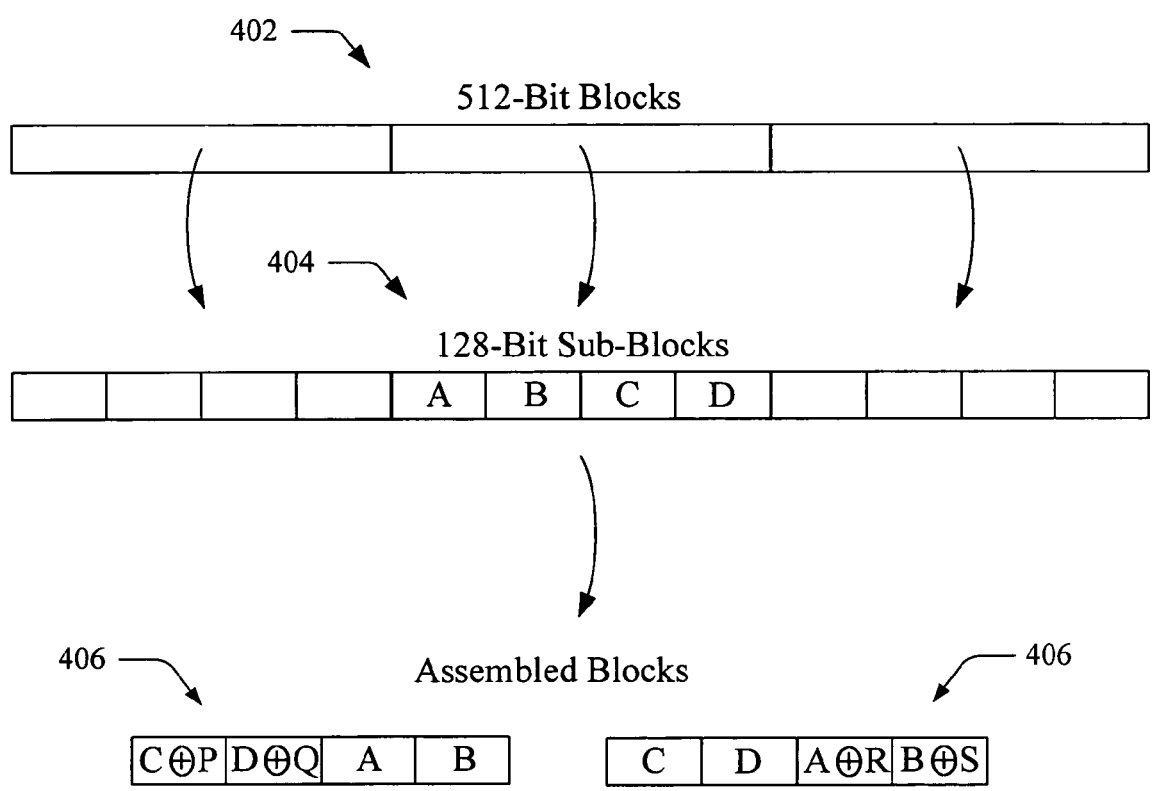
FIG. 4 illustrates exemplary blocks of a message, sub-blocks of the blocks, and assembled blocks.

These blocks are shown in FIG. 4 at 406. These assembled blocks each contain elements that are not easily controllable with small, controlled changes to the bits of a message. These elements also make more difficult attempts to create a collision using small, controlled changes to bits of a message.

Each of these assembled blocks can be of a size capable of being hashed in the same way as the blocks of a message on which they are based. Many secure hash functions, while requiring more computational time, are easily capable of handling additional blocks of a same size.

Steps 304, 306, 308, and/or 310 may be repeated over each block or one or more other blocks of a message. By repeating these actions most or all of a message can be pre-processed to comprise reproducible, random-appearing elements, such as the XOR blocks of the illustrated embodiment.

Step 312 computes a secure hash function over an assembly of sub-blocks and XOR sub-blocks. If a message comprises more than one block (as is often the case) a secure hash function is computed over multiple assemblies of sub-blocks and XOR sub-blocks. In the illustrated embodiment, hash generator 108 uses SHA-1 to compute a 160-bit hash of the assemblies of sub-blocks and XOR sub-blocks. By so doing, a hash can be computed that is based on and is reproducible from a message.

For example, if second message 114 is processed as set forth in FIG. 3, a resulting hash for the second message will be identical to that of first message 112 if second message 114 and first message 112 are identical. If the hashes are identical, the first message or the second message can be authenticated. If they are not identical, it can be shown that the first message and the second message are not identical.

Encryption Keys

The following discussion describes exemplary ways in which the tools strengthen secure hash functions by reducing potential control over an encryption key used in pre-processing a message. As described in FIGS. 2 or 3, the tools strengthen secure hash functions in part by creating an element that is not easily controllable by an adversary manipulating bits of a message from which the element is derived.

Figure 5:
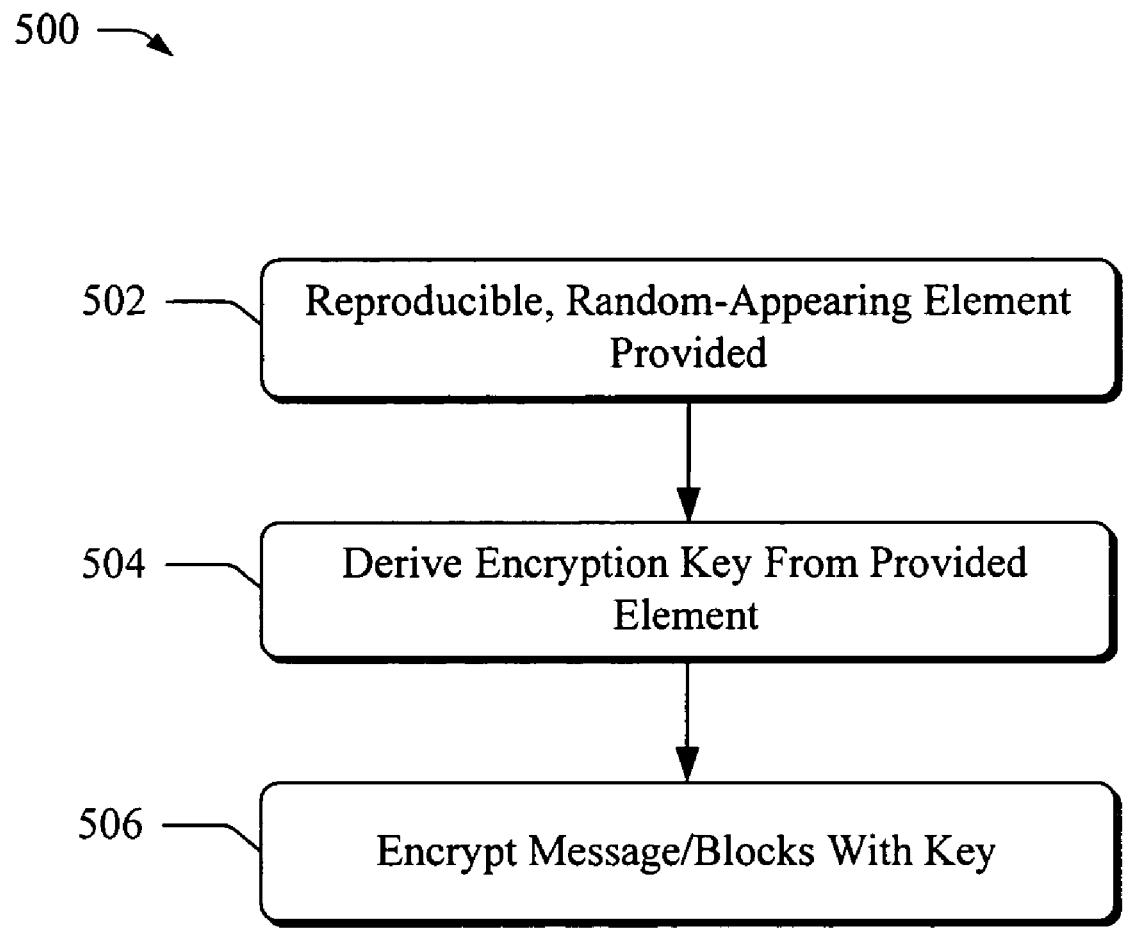
FIG. 5 is an exemplary process for reducing control over an encryption key.

FIG. 5 sets for an exemplary process 500 for reducing control over an encryption key. Process 500 is shown illustrated as a series of steps representing individual operations or acts performed by elements of the operating environment 100 of FIG. 1, such as hash pre-processor 110.

Figure 6:
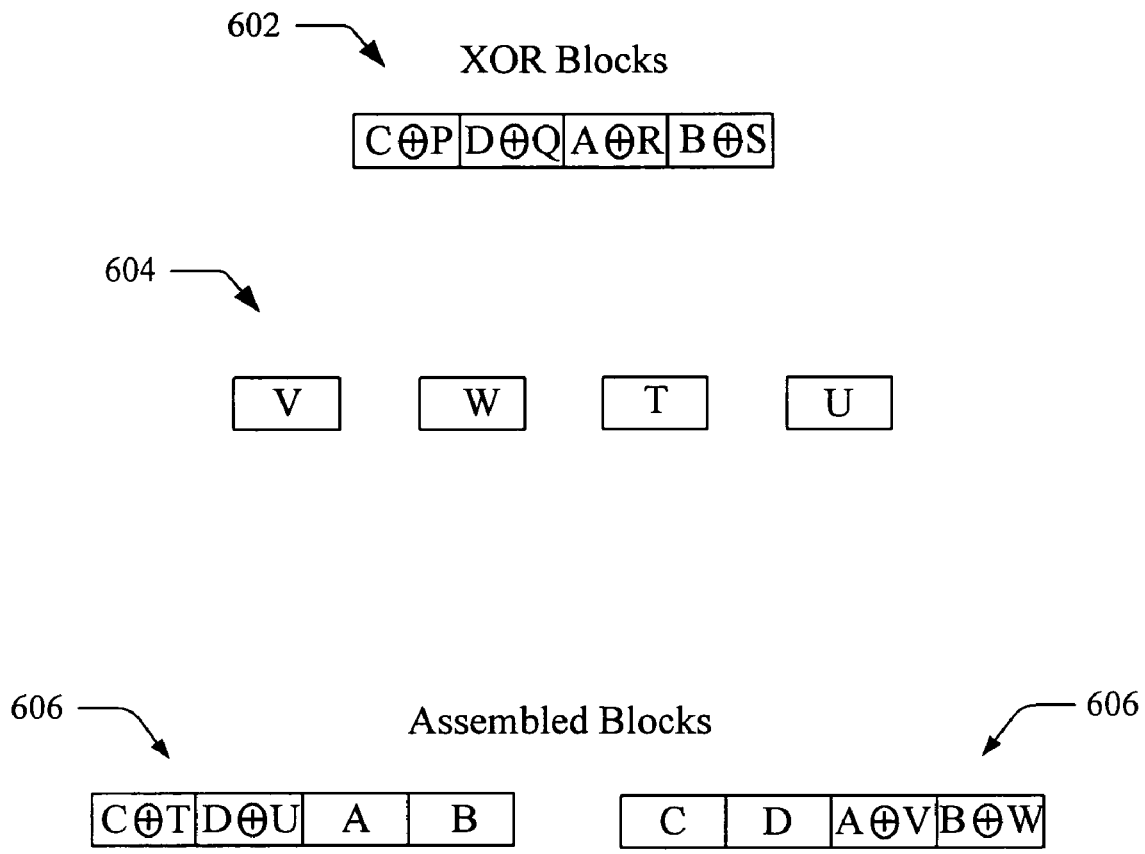
FIG. 6 illustrates exemplary XOR blocks of a message, encrypted sub-blocks, and assembled blocks.

Step 502 derives a reproducible, random-appearing element from a message. In an illustrated embodiment shown in FIG. 6, XOR sub-blocks 602 resulting from step 308 are provided. These XOR sub-blocks and their constituent encrypted sub-blocks P, Q, R, and S are intermediate in this embodiment as they are used to build elements that will be assembled into blocks for hashing but can not be hashed themselves.

Thus, the following can be received:

$C \oplus P$ $D \oplus Q$ $A \oplus R$ $B \oplus S$

Step 504 derives a random-appearing encryption key from a reproducible, random-appearing element derived from a message. Here hash pre-processor 110 builds random-appearing encryption keys "$_{RAE-n}$", where "$_n$" represents the element(s) from which the key is derived, based on XOR sub-blocks 602 shown in FIG. 6. This can be represented as:

$C \oplus P \| D \oplus Q \rightarrow_{RAE-cpdq}$ $A \oplus R \| B \oplus S \rightarrow_{RAE-arbs}$ Step 506 encrypts part of a message using a random-appearing encryption key (an "RAE key"). Here sub-blocks 404 A, B, C, and D resulting from step 304 of FIG. 3 are encrypted using RAE keys derived from XOR sub-blocks 602 at step 504. This provides RAE-key encrypted sub-blocks 604 labeled V, W, T, and U. Thus, sub-blocks 404 are encrypted using encryption function $E_n$ having an RAE key $_{RAE-n}$ to provide RAE-key encrypted sub-blocks.

This is represented mathematically by:

$E_{RAE-cpdq}(A) = V$ $E_{RAE-cpdq}(B) = W$ $E_{RAE-arbs}(C) = T$ $E_{RAE-arbs}(D) = U$ These RAE-key encrypted sub-blocks can then be treated as encrypted blocks following process 300 of FIG. 3. Here P=T, Q=U, R=V, and S=W. Following steps 308 and 310 of FIG. 3 for instance, the following assembled blocks 606 result:

$C \oplus T \| D \oplus U \| A \| B$ and $A \oplus V \| B \oplus W \| C \| D$

CONCLUSION

The above-described systems and methods strengthen secure hash functions. These systems and methods may significantly reduce the effectiveness of some types of attacks attempting to create collisions between messages. By so doing, messages may be authenticated using secure hash functions to a higher degree of certainty. Although the system and method has been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

The invention claimed is:

1. One or more computer-readable storage media having computer-readable instructions therein that, when executed by a computer, cause the computer to perform acts comprising:

creating a random-appearing element based on a message and using a process, wherein the process comprises encrypting a portion of the message using a block cipher to provide an encrypted portion and computing an exclusive-or (XOR) on the encrypted portion and the portion of the message to provide the random-appearing element; and assembling the element with the message to provide an assembly, the assembly capable of being hashed with a secure hash function to provide a hash, the hash having a length identical to a second hash's length resulting from the message being hashed by the same secure hash function, wherein the process is capable of creating a second random-appearing element based on a second message, the second random-appearing element being identical to the first random-appearing element if the second message is identical to the first message.

2. The media of claim 1, wherein the act of assembling comprises concatenating the random-appearing element and the message.

3. The media of claim 1, wherein the secure hash function comprises Secure Hash Algorithm-1.

4. The media of claim 1, wherein the act of creating the random-appearing element comprises:

receiving an intermediate random-appearing element based on the message;

deriving a random-appearing encryption key from the intermediate, random-appearing element;

encrypting a portion of the message with an encryption function using the random-appearing encryption key to provide an encrypted portion; and computing an exclusive-or (XOR) of the encrypted portion and the portion to provide the random-appearing element.

5. The media of claim 4, wherein the encryption function comprises a 128-bit Advanced Encryption Standard block-cipher encryption function.

6. One or more computer-readable storage media having computer-readable instructions therein that, when executed by a computer, cause the computer to perform acts comprising:

encrypting a first sub-block and a second sub-block of a block of data to provide an encrypted first sub-block and an encrypted second sub-block;

computing an exclusive-or (XOR) of the first sub-block and the first encrypted sub-block to provide a first XOR sub-block;

computing an XOR of the second sub-block and the second encrypted sub-block to provide a second XOR sub-block; and assembling the first XOR sub-block and the second XOR sub-block with the first sub-block and the second sub-block to provide a first assembled block and a second assembled block.

7. The media of claim 6, wherein the act of encrypting comprises performing a block cipher over the first sub-block and the second sub-block.

8. The media of claim 6, wherein the act of encrypting comprises:

encrypting the first sub-block using a first encryption key derived from the second sub-block; and encrypting the second sub-block using a second encryption key derived from the first sub-block.

9. The media of claim 8, wherein the act of encrypting comprises encrypting a third sub-block and a fourth sub-block and further comprising encrypting the third sub-block using a third encryption key derived from the first, second, or fourth sub-block and encrypting the fourth sub-block using a fourth encryption key derived from the first, second, or third sub-block.

10. The media of claim 9, wherein the first assembled block or the second assembled block is a concatenation of the first XOR block, the second XOR block, the third sub-block, and the fourth sub-block.

11. The media of claim 6, wherein the act of encrypting comprises performing an Advanced Encryption Standard block-cipher encryption function.

12. The media of claim 6, wherein the block is a portion of a message and further comprising dividing the block into the first sub-block and the second sub-block.

13. The media of claim 12, further comprising dividing the message into a plurality of blocks and wherein the block is one of the plurality of blocks.

14. The media of claim 6, wherein the block is 512 bits long and the sub-blocks are 128 bits long.

15. The media of claim 6, further comprising computing a hash over the first and second assembled blocks.

16. A computer implemented method having instructions executable by a processor, comprising:

computing, where A, B, C, and D are portions of a message, E is an encryption function, $E_{cd}$ is an encryption key derived from the portions C and D, and $E_{ab}$ is an encryption key derived from the portions A and B:

$$C \oplus E_{ab}(C)$$

$$D \oplus E_{ab}(D)$$

$$A \oplus E_{cd}(A)$$

$$B \oplus E_{cd}(B)$$

and, computing to provide hash h, where H is a secure hash function:

$$H(C \oplus P \| D \oplus Q \| A \| B \| A \oplus R \| B \oplus S \| C \| D) = h.$$

17. The method of claim 16, wherein E comprises a 128-bit Advanced Encryption Standard (AES) encryption function.

18. The method of claim 16, wherein H comprises a Secure Hash Algorithm-1 (SHA-1.

* * * * *